United States Patent [19]

Schulte

[11] Patent Number: 4,587,988
[45] Date of Patent: May 13, 1986

[54] HYDRAULIC PRESSURE-RELIEF VALVE

[75] Inventor: Heinz Schulte, Marktheidenfeld, Fed. Rep. of Germany

[73] Assignee: Mannesmann Rexroth GmbH, Lohr/Main, Fed. Rep. of Germany

[21] Appl. No.: 649,511

[22] Filed: Sep. 12, 1984

[30] Foreign Application Priority Data

Sep. 14, 1983 [DE] Fed. Rep. of Germany ....... 3333164

[51] Int. Cl.$^4$ .............................................. F16K 17/02
[52] U.S. Cl. ..................................... 137/110; 137/115; 137/494
[58] Field of Search ..................... 137/494, 115, 625.3, 137/110

[56] References Cited

U.S. PATENT DOCUMENTS

| | | | |
|---|---|---|---|
| 3,288,166 | 11/1966 | Wagner | 137/625.3 X |
| 4,111,227 | 5/1978 | Sigott | 137/494 X |
| 4,284,101 | 8/1981 | Weirich | 137/494 X |

Primary Examiner—Alan Cohan
Attorney, Agent, or Firm—Andrew M. Wilford

[57] ABSTRACT

A pressure-relief valve has a housing forming a chamber extending along an axis and a valve seat centered on the axis and subdividing the chamber into an outer high-pressure compartment and an inner low-pressure compartment. The seat defines generally the only fluid-communication path between the compartments. A pump and a load can be connected to the high-pressure compartment and a sump to the low-pressure compartment. A valve body is formed with a central radially outwardly open main groove, an outer face exposed in the high-pressure compartment, an inner face exposed in the low-pressure compartment, a radially outwardly open control groove offset axially inward from the main groove toward the inner face, and a diametrally throughgoing control bore at the main and control grooves. The body is axially displaceable through the seat between a closed position substantially blocking the seat with the main groove and control bore axially offset therefrom and an open position axially offset toward the low-pressure compartment from the closed position and with the main groove and control bore at the seat for flow through the main groove and seat between the compartments, and through an intermediate position between the open and closed positions and with the control bore at the seat for flow through the control bore and control groove between the compartments. A spring urges the valve body axially outward toward the high-pressure compartment into the closed position.

7 Claims, 2 Drawing Figures

HYDRAULIC PRESSURE-RELIEF VALVE

FIELD OF THE INVENTION

The present invention relates to a hydraulic pressure-control valve. More particularly this invention concerns a pressure-relief valve.

BACKGROUND OF THE INVENTION

A standard pressure-relief valve is connected between a high-pressure line and a sump and serves to bleed fluid from the line to the sump when pressure in the line exceeds a predetermined limit. This type of arrangement is used, for instance, when the pump is of the constant-displacement type and the load is of variable displacement, so the valve prevents dangerous overpressures from developing.

A standard such valve has a housing forming a chamber extending along an axis and a valve seat centered on the axis and subdividing the chamber into an outer high-pressure compartment and an inner low-pressure compartment. This seat defines the only fluid-communication path between the compartments. Conduits supply fluid under high pressure to the high-pressure compartment and withdraw fluid from the low-pressure compartment so that a pump and a load can be connected to the high-pressure compartment and a sump to the low-pressure compartment. A valve body centered on the axis is formed with a central radially outwardly open main groove, an outer face exposed in the high-pressure compartment, and a diametrally throughgoing control bore at the main groove. This body is axially displaceable through the seat between a closed position substantially blocking the seat with the main groove and control bore axially offset therefrom and an open position axially offset toward the low-pressure compartment from the closed position and with the main groove and control bore at the seat for flow through the main groove and seat between the compartments. A spring urges the valve body axially outward toward the high-pressure compartment into the closed position.

The relatively long stroke of such a valve body or spool between the open and closed positions causes the valve to respond somewhat slowly. With a great pressure differential the seat, which is normally cylindrical and fairly short, is wholly out of engagement with the spool, so that same can cant and jam. In addition with a standard spring the resistance to compression increases disproportionately with compression, so that inward movement of the valve spool is resisted with a force that increases as the displacement increases, so that in effect the pressure response can vary.

OBJECTS OF THE INVENTION

It is therefore an object of the present invention to provide an improved pressure-relief valve.

Another object is the provision of such a pressure-relief valve which overcomes the above-given disadvantages, that is which responds rapidly at a uniform pressure, yet which is virtually unjammable.

SUMMARY OF THE INVENTION

A pressure-relief valve according to the invention has a housing forming a chamber extending along an axis and a valve seat centered on the axis and subdividing the chamber into an outer high-pressure compartment and an inner low-pressure compartment. The seat defines generally the only fluid-communication path between the compartments. Conduits supply fluid under high pressure to the high-pressure compartment and withdraw fluid from the low-pressure compartment so that a pump and a load can be connected to the high-pressure compartment and a sump to the low-pressure compartment. A valve body centered on the axis is formed with a central radially outwardly open main groove, an outer face exposed in the high-pressure compartment, an inner face exposed in the low-pressure compartment, a radially outwardly open control compartment, a radially outwardly open control groove offset axially inward from the main groove toward the inner face, and a diametrally throughgoing control bore at the main and control grooves. The body is axially displaceable through the seat between a closed position substantially blocking the seat with the main groove and control bore axially offset therefrom and an open position axially offset toward the low-pressure compartment from the closed position and with the main groove and control bore at the seat for flow through the main groove and seat between the compartments, and through an intermediate position between the open and closed positions and with the control bore at the seat for flow through the control bore and control groove between the compartments. A spring urges the valve body axially outward toward the high-pressure compartment into the closed position.

Thus the system of this invention opens with a relatively large flow cross section as soon as the inner flank of the control groove passes the inner control edge of the seat. This can take place after a very short axial travel of the valve body for fast action.

According to another feature of this invention the control bore axially overlaps the control groove inwardly and outwardly, that is the axially innermost portion of the control bore is axially inward of the inner flank of the control groove and the axially outermost portion of the control bore is axially outward from the outer flank of the control groove. In fact the control bore and main groove overlap quite a bit also. In other words, the control bore has a diameter substantially greater than the axial width of the control groove.

To prevent the valve body from twisting and jamming in the housing, the seat is cylindrical and has an axial length that is greater than the axial width of the control groove. Furthermore the main groove has an axial width greater than the axial length of the seat.

In accordance with further features of this invention the housing includes a guide sleeve having a guide bore forming the seat and slidably receiving the valve body. The spring itself is a compression spring braced axially between the valve body and the housing.

DESCRIPTION OF THE DRAWING

The above and other features and advantages will become more readily apparent from the following, reference being made to the accompanying drawing in which.

SPECIFIC DESCRIPTION

Figure 1:
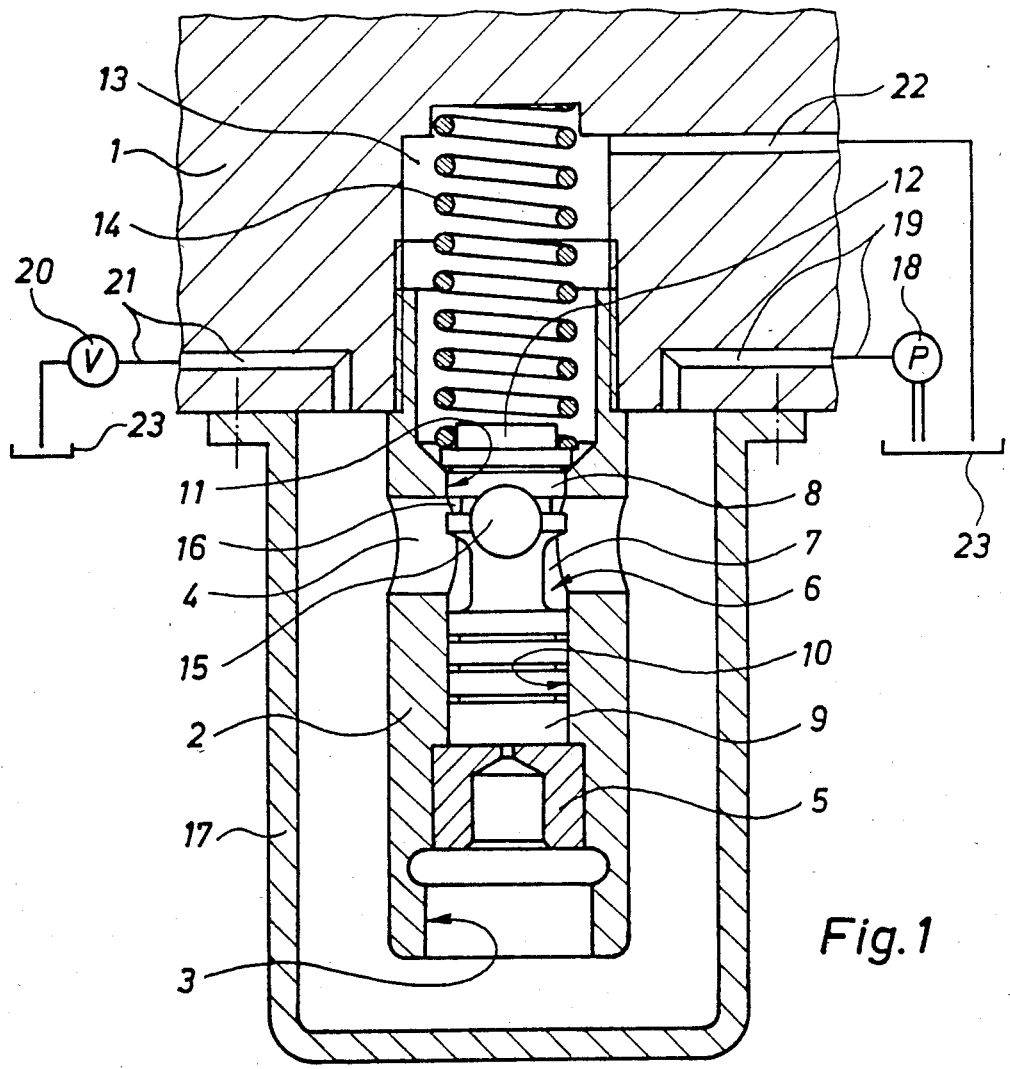
FIG. 1 is a partly diagrammatic axial section through the valve according to this invention.

As seen in the drawing, a pressure-relief valve according to this invention has a housing 1 fitted with a cylindrical cup 17 centered on an axis A and formed with a partially threaded bore also centered on this axis A and threadedly receiving an axially centered cylinder or guide tube 2 formed with a stepped axial bore 3. A large-diameter transverse bore 4 extending perpendicular to the axis A is formed diametrally through the tube 2 and subdivides its interior into an inner cylindrical seat 11 and an outer cylindrical guide 10. The seat 11 terminates inwardly at a circular control edge 27 that is the outer edge of an inwardly flared frustoconical surface 28. A plug 5 constituting an abutment closes the axially outer (here down) end of the tube 2 and is formed with a throughgoing pilot bore 24 at the axis.

Figure 2:
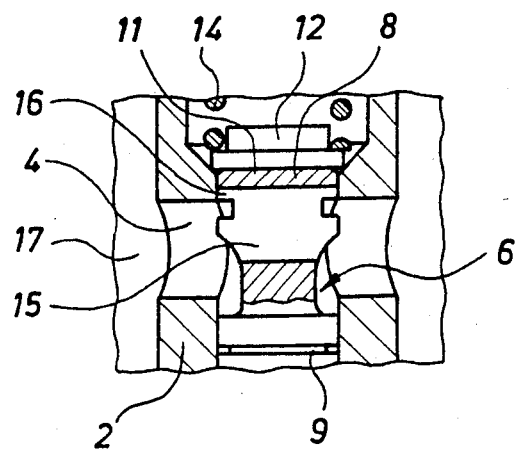
FIG. 2 is an axial section through a detail of FIG. 1, but with the valve spool rotated through 90° for clarity of view.

An axially mainly symmetrical valve spool 6 is axially displaceable in the bore 3 and has a cylindrical inner end portion 8, an outer cylindrical portion 9, and an intermediate portion formed as a wide radially outwardly open groove 7 of an axial width W and of rounded U-section. A substantially narrower groove 16 of square section and of an axial width w (FIG. 2) is formed in the portion 11, spaced from the inner edge of the groove 7 approximately by the width w. This groove 16 has parallel inner and outer flanks lying in planes perpendicular to the axis A and spaced apart by the above-described dimension w. A cylindrical throughgoing bore 15 of a diameter d equal to less than the width W but more than the width w traverses the spool 6 centered on an axis A' perpendicular to the axis A at a location overlapping the grooves 6 and 16 and in fact having an axially innermost side slightly inward of the inner flank of the groove 16. The extreme inner end of this spool 6 is formed as a spring seat 12 and a compression spring 14 is axially compressed between this seat 12 and the bottom of the bore 25. This spring 14 therefore urges the spool 6 axially into the illustrated outer position in which its inner portion 8 completely blocks the seat 11. In this position the spool 6 defines in the valve an inner chamber 13 and an outer chamber 26.

A pump 18 has an intake side connected to a low-pressure sump 23 and an output side connected via a conduit or passage 19 to the outer compartment 26. In addition, a load, here a motor 20, is connected via a conduit or passage 21 to this compartment 26 and on its other side to the sump 23. A conduit or passage 22 connects the inner compartment 13 to the sump 23 also.

Thus the high pressure of the pump 18 is applied through the bore 24 to the outer face of the spool 6, in an axial direction opposite that of the force the spring 14 is applying to the spool 6. This spring force is such that under normal circumstances, that is when the motor 20 is using liquid and preventing pressure from building up in the chamber 26 to a dangerous level, the outwardly directed spring force will greatly exceed the inwardly directed hydraulic force. This holds the spool 6 out against the abutment plug 5 in the illustrated position in which the inner portion 8 completely blocks fluid communication between the compartments 26 and 13.

As pressure builds up in the chamber 26, which can happen when the motor 20 is operating under a very heavy load or is stalled, the hydraulic pressure will become greater than the spring force so the spool 6 will start to move axially inward. When the innermost portion of the bore 15 moves inward of the circular inner edge of the seat 11, there will be some flow from the chamber 26 through the bores 4 and 15 into the vent chamber 13 and thence back to the sump 23. If the overpressure is very slight, this small amount of bleed-back might be sufficient to reduce the pressure in the compartment 26 sufficiently to hold the spool in this position.

When the pressure is higher, however, the small flow out the exposed generally crescent-shaped portions of the bore 15 will not be sufficient to reduce pressure in the chamber 26. Thus the spool 6 will continue to move inward (up in FIGS. 1 and 2) until the inner flank of the groove 16 passes the control edge 27. This will open up a substantial flow cross section open radially outwardly in every direction and having an area formed by an imaginary cylinder centered on the axis A and having an inner end at the outer edge of the inner flank of the groove 16 and an outer end at the control edge 27. Thus there can be considerable flow from the compartment 26 through the bores 4 and 15 to the groove 16 and thence into the chamber 13. Normally this amount of flow is sufficient to limit pressure buildup in the chamber 26.

The system of this invention allows a relatively short axial stroke of the spool 6 to open up a relatively large flow cross section between the high-pressure compartment 26 and the vent. The axial stroke of the spool 6 is so short that even at maximum flow cross section between the compartments 26 and 13 the spool portion 8 is still received and guided in the cylindrical seat while of course the portion 9 is received and guided in the cylindrical outer guide 11, so that canting and jamming of this spool are impossible.

The control bore 15 should be so large and positioned such that its flow cross section is relatively small compared to that of the groove 7. The cross section of the control groove 16 can be somewhat smaller, but should be around ten times larger than the maximum flow section of the bore 15 at the groove 16. Thus substantial flow is possible from the control groove 16.

I claim:
1. A pressure-relief valve comprising:
a housing forming
   a chamber extending along an axis, and
   a valve seat centered on the axis and subdividing the chamber into an outer high-pressure compartment and an inner low-pressure compartment, the seat defining generally the only fluid-communication path between the compartments;
means including conduits for supplying fluid under high pressure to the high-pressure compartment and for withdrawing fluid from the low-pressure compartment, whereby a pump and a load can be connected to the high-pressure compartment and a sump to the low-pressure compartment;
a valve body centered on the axis and formed with
   a central radially outwardly open main groove,
   an outer face exposed in the high-pressure compartment,
   an inner face exposed in the low-pressure compartment,
   a radially outwardly open control groove offset axially inward from the main groove toward the inner face, and
   a diametrally throughgoing control bore at the main and control grooves,
the body being axially displaceable through the seat between a closed position substantially blocking the seat with the main groove and control bore axially offset therefrom and an open position axially offset toward the low-pressure compartment from the closed position and with the main groove and control bore at the seat for flow through the main groove and seat between the compartments, and through an intermediate position between the open and closed positions and with the control bore at the seat for flow through the control bore and control groove between the compartments; and spring means for urging the valve body axially outward toward the high-pressure compartment into the closed position.

2. The pressure-relief valve defined in claim 1 wherein the control bore axially overlaps the control groove inwardly and outwardly.

3. The pressure-relief valve defined in claim 2 wherein the control bore has a diameter and the control groove has an axial width substantially smaller than the diameter.

4. The pressure-relief valve defined in claim 3 wherein the seat is cylindrical and has an axial length that is greater than the axial width of the control groove.

5. The pressure-relief valve defined in claim 3 wherein the main groove has an axial width greater than the axial length of the seat.

6. The pressure-relief valve defined in claim 3 wherein the housing includes a guide sleeve having a guide bore forming the seat and slidably receiving the valve body.

7. The pressure-relief valve defined in claim 3 wherein the spring means includes a compression spring braced axially between the valve body and the housing.

* * * * *